(12) United States Patent
Xia et al.

(10) Patent No.: US 10,423,542 B2
(45) Date of Patent: Sep. 24, 2019

(54) DATA TRANSMISSION METHOD AND SYSTEM FOR TRANSMITTING DATA BETWEEN PROCESSES USING SHARED MEMORY BLOCK INDEXES

(71) Applicant: BEIJING BAIDU NETCOM SCIENCE AND TECHNOLOGY CO., LTD., Haidian District Beijing (CN)

(72) Inventors: Liming Xia, Haidian District Beijing (CN); Jingchao Feng, Haidian District Beijing (CN); Quan Wang, Haidian District Beijing (CN); Ning Qu, Haidian District Beijing (CN); Zhuo Chen, Haidian District Beijing (CN)

(73) Assignee: Beijing Baidu Netcom Science And Technology Co., Ltd, Beijing (CN)

( * ) Notice: Subject to any disclaimer, the term of this patent is extended or adjusted under 35 U.S.C. 154(b) by 132 days.

(21) Appl. No.: 15/281,261

(22) Filed: Sep. 30, 2016

(65) Prior Publication Data

US 2017/0371810 A1    Dec. 28, 2017

(30) Foreign Application Priority Data

Jun. 24, 2016   (CN) .......................... 2016 1 0473408

(51) Int. Cl.
*G06F 12/14*     (2006.01)
*G06F 3/06*      (2006.01)
(Continued)

(52) U.S. Cl.
CPC .......... *G06F 12/1425* (2013.01); *G06F 3/064* (2013.01); *G06F 3/0613* (2013.01);
(Continued)

(58) Field of Classification Search
CPC .... G06F 12/1425; G06F 3/064; G06F 3/0683; G06F 3/0659; G06F 3/0647;
(Continued)

(56) References Cited

U.S. PATENT DOCUMENTS

| 6,070,194 A * | 5/2000 | Yu ......................... G06F 15/167 709/213 |
| 2002/0029800 A1* | 3/2002 | West ..................... G06F 15/167 137/100 |
| 2009/0083393 A1* | 3/2009 | Mizukami ............... G06F 15/16 709/214 |

FOREIGN PATENT DOCUMENTS

| CN | 101901250 A | 12/2010 |
| CN | 104346227 A | 2/2015 |

* cited by examiner

*Primary Examiner* — Arpan P. Savla
(74) *Attorney, Agent, or Firm* — Miller, Matthias & Hull LLP

(57) ABSTRACT

A method and a system for transmitting data are disclosed. A method embodiment comprises: acquiring a most recent shared memory block index of a shared memory segment by a data receiver, the shared memory segment being used by a data transmitter and the data receiver to transmit data; deciding whether the most recent shared memory block index is consistent with a shared memory block index corresponding to data recently read by the data receiver; and determining, according to the decision, whether to read the data in the shared memory block corresponding to the most recent shared memory block index, where the determining includes reading the data in the shared memory block corresponding to the most recent shared memory block index when the decision indicates that the most recent shared memory block index is inconsistent with the shared memory block index corresponding to the data recently read by the data receiver.

7 Claims, 4 Drawing Sheets

(51) Int. Cl.
*G06F 13/16* (2006.01)
*H04L 12/861* (2013.01)
*H04L 12/70* (2013.01)

(52) U.S. Cl.
CPC .......... *G06F 3/0647* (2013.01); *G06F 3/0659* (2013.01); *G06F 3/0683* (2013.01); *G06F 13/1663* (2013.01); *H04L 49/90* (2013.01); *H04L 49/9094* (2013.01); *G06F 2212/1052* (2013.01); *H04L 2012/5681* (2013.01)

(58) Field of Classification Search
CPC ............... G06F 13/1663; G06F 3/0613; G06F 2212/1052; H04L 49/9094; H04L 49/90; H04L 2012/5681
See application file for complete search history.

DATA TRANSMISSION METHOD AND SYSTEM FOR TRANSMITTING DATA BETWEEN PROCESSES USING SHARED MEMORY BLOCK INDEXES

CROSS-REFERENCE TO RELATED APPLICATION

This application claims priority of Chinese Patent Application No. 201610473408.X, entitled "DATA TRANSMISSION METHOD AND SYSTEM", filed on Jun. 24, 2016 in the State Intellectual Property Office (SIPO) of China, the contents of which are herein incorporated by reference in their entirety.

TECHNICAL FIELD

The present disclosure relates to the field of computer technology, specifically to the field of data transmission, and more specifically to a method and system for transmitting data.

BACKGROUND

When operating a system (e.g. a control system of an autonomous vehicle), in order to ensure stability and security of the system, it is of the utmost importance to ensure the multiple processes in the system to keep communicating with each other efficiently and safely. Currently, a commonly employed mode for transmitting data between multiple processes is: a data receiving process sequentially reads data from a shared memory segment, and principally follows the slowest data reading frequency when the frequency for processing data by the data receiving process is lower than the frequency for transmitting data by the data transmitting process. Accordingly, the data transmitting process writes data into the shared memory segment at the lowest frequency among all of the receiving program nodes.

However, transmitting data by employing the above mode causes, on one hand, the data transmitting process to be blocked. As a result, massive new data may not be timely written into the shared memory segment. On the other hand, the data receiving process is led to be only able to process outdated data. In the control system of an autonomous vehicle for example, when it is required to make a driving decision through the data processing by the data receiving process, the control system of the autonomous vehicle is caused to make an obsolete and wrong driving decision. As a result, the extremely high demand for instantaneity of the control system of the autonomous vehicle, for example, may not be satisfied.

SUMMARY

The present application provides a method and a system for transmitting data in order to solve the technical problems mentioned in the foregoing Background section.

In a first aspect, the present application provides a data transmission method. The method comprises: acquiring a most recent shared memory block index of a shared memory segment by a data receiver, the shared memory segment being used by a data transmitter and the data receiver to transmit data, the most recent shared memory block index being used for indicating an address of a shared memory block in a shared memory segment where data recently written by the data transmitter is located; deciding whether the most recent shared memory block index is consistent with a shared memory block index corresponding to data recently read by the data receiver; and determining, according to the decision, whether to read the data in the shared memory block corresponding to the most recent shared memory block index.

In a second aspect, the present application provides a data transmission system. The data transmission system comprises a data receiver and a data transmitter. The data receiver is used for: acquiring a most recent shared memory block index of a shared memory segment, the shared memory segment being used by the data transmitter and the data receiver to transmit data, the most recent shared memory block index being used for indicating an address of a shared memory block in a shared memory segment where data recently written by the data transmitter is located; deciding whether the most recent shared memory block index is consistent with a shared memory block index corresponding to data recently read by the data receiver; and determining, according to the decision, whether to read the data in the shared memory block corresponding to the most recent shared memory block index.

According to the present application, when the frequency at which the data receiving process processes data is lower than the frequency at which the data transmitting process transmits data, the data receiving process directly reads the most recent data and abandons the outdated data which is not processed in time, without influencing other data receiving processes that process data in a higher frequency. This is implemented by acquiring a most recent shared memory block index of a shared memory segment by a data receiver, the shared memory segment being used by a data transmitter and the data receiver to transmit data, the most recent shared memory block index being used for indicating an address of a shared memory block in a shared memory segment where data recently written by the data transmitter is located; deciding whether the most recent shared memory block index is consistent with a shared memory block index corresponding to data recently read by the data receiver; and determining, according to the decision, whether to read the data in the shared memory block corresponding to the most recent shared memory block index. Accordingly, the extremely high demand for instantaneity for processing data by a process in the control system of an autonomous vehicle, for example, is satisfied. Therefore, the security and stability of the system are improved.

BRIEF DESCRIPTION OF THE DRAWINGS

Other features, objectives and advantages of the present application will become more apparent upon reading the detailed description to non-limiting embodiments with reference to the accompanying drawings, wherein.

DETAILED DESCRIPTION OF PREFERRED EMBODIMENTS

The present application will be further described below in detail in combination with the accompanying drawings and the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
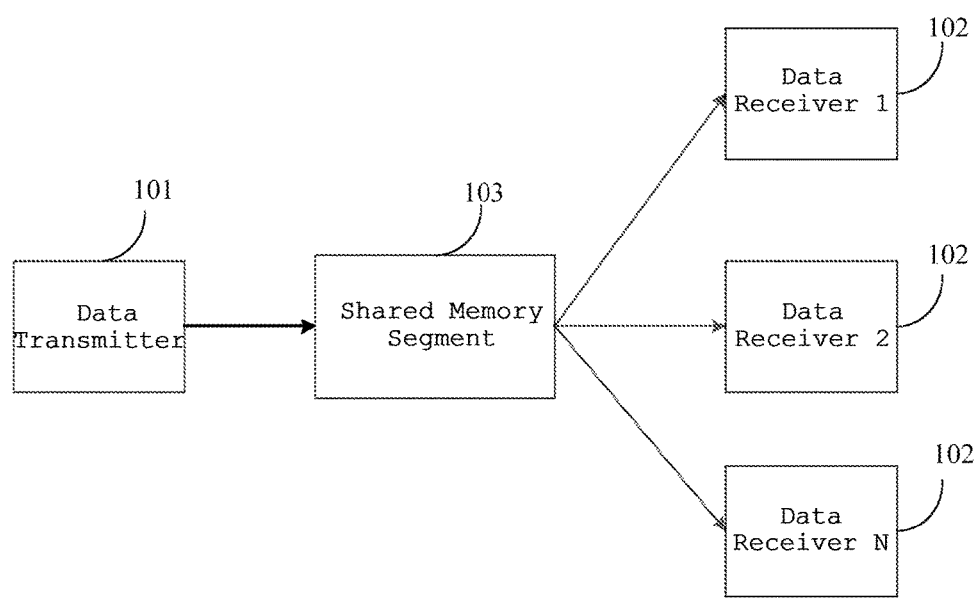
FIG. 1 illustrates an exemplary system framework applicable to the data transmission method or system of the present application.

FIG. 1 illustrates an exemplary system framework 100 applicable to the data transmission method or system according to an embodiment of the present application.

As shown in FIG. 1, the system framework 100 may comprise: a data transmitter 101, a plurality of data receivers 102, and a shared memory segment 103. The data transmitter 101 and the data receiver 102 transmit data by utilizing the shared memory segment 103. The data transmitter 101 and the data receiver 102 may be processes operating in a same system. Taking a control system of an autonomous vehicle as an example, the data transmitter 101 may be used for capturing data. For example, the data transmitter may be a processing program for a sensor. The data receiver 102 may be used for processing data. For example, the data receiver may be a decision-making and controlling program.

Figure 2:
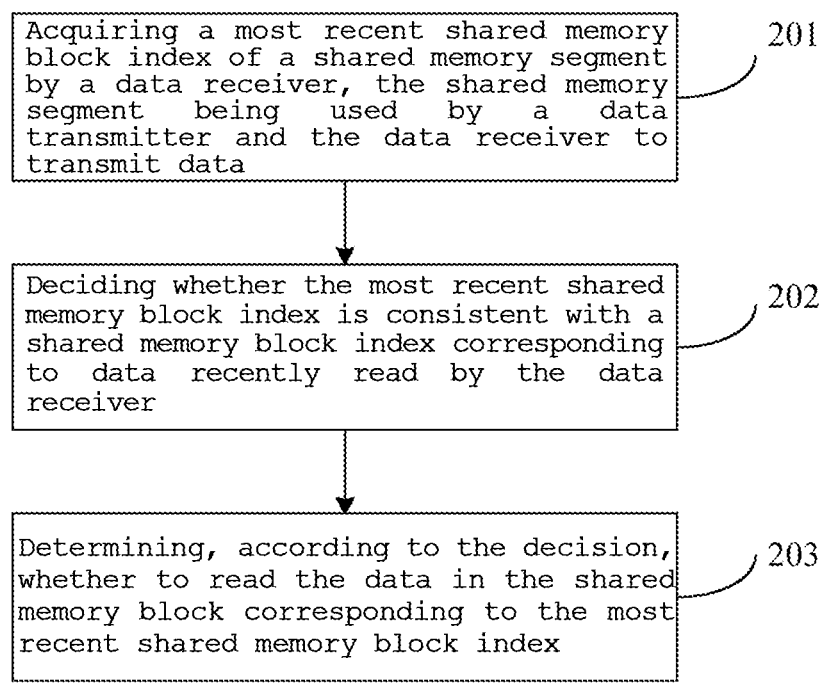
FIG. 2 illustrates a flowchart of a data transmission method according to an embodiment of the present application.

Reference is made to FIG. 2, which illustrates a flowchart 200 of a data transmission method according to an embodiment of the present application. The method comprises the following steps.

At step 201, the data receiver acquires a most recent shared memory block index of a shared memory segment, the shared memory segment being used by the data transmitter and the data receiver to transmit data.

In an embodiment, the most recent shared memory block index is used for indicating an address of an shared memory block in the shared memory segment where the data recently written by the data transmitter is located.

In the present embodiment, the data may be transmitted between the data transmitter and the data receiver via the shared memory segment. The following description is made on basis of the example that the data transmitter and the data receiver are two processes in a control system of an autonomous vehicle into account. One of the processes is a data transmitting process for capturing, via a camera, traffic images of the road on which the autonomous vehicle is currently traveling. The other process is a data receiving process for analyzing the traffic images to identify obstacles. The data transmitting process is required to provide the captured traffic images, and the data receiving process is required to receive and analyze the traffic images captured by the data transmitting process so as to identify obstacles. The type of the data to be transmitted between the data transmitting process and the data receiving process, i.e., the traffic image, may be referred to as a title. The data transmitter may create a shared memory segment for the title. The shared memory segment is used for data transmission between the data transmitter and the data receiver.

The data transmitter may write the data to be transmitted into the shared memory segment. The data receiver may read, from the memory data segment, the data to be transmitted which is written into the shared memory segment by the data transmitter. The shared memory segment may be divided into several shared memory blocks. The data transmitter and the data receiver may write/read the data to be transmitted into/from the memory data blocks. Each of the shared memory blocks corresponds to one index. The shared memory block may be searched via the corresponding index of the shared memory block.

In some optional implements of the present embodiment, the data transmitter is a data transmitting process, and the data receiver is a data receiving process.

In the present embodiment, the data transmitter may be a data transmitting process, and the data receiver may be a data receiving process. In the present embodiment, data may be transmitted between a plurality of data transmitting progresses and a plurality of data receiving processes via a same shared memory segment. The shared memory block corresponding to the index may be searched by the plurality of data transmitting progresses and the plurality of data receiving processes via the index of the shared memory block. Data is written and read into/from the shared memory block corresponding to the searched index.

In the present embodiment, there may be a plurality of data transmitters and data receivers which utilize the shared memory segment to transmit data. The plurality of data transmitters and data receivers may correspond to one title. The plurality of data transmitters may write the data to be transmitted into the shared memory segment corresponding to the title, and the plurality of data receivers may read the data to be transmitted from the shared memory segment corresponding to the title.

In some optional implements of the present embodiment, the shared memory segment may include a general flag variable and a general flag lock variable, the general flag variable being used for storing the most recent shared memory block index.

In the present embodiment, the general flag variable may be stored in the shared memory segment and used for storing the most recent shared memory block index. The general flag lock variable is required when the data transmitting process and the data receiving process need to modify the value of the general flag variable. After that, the value of the general flag variable is modified.

In some optional implements of the present embodiment, the method further comprises: acquiring the general flag lock variable by the data sending process; determining an index of a shared memory block for storing data to be written in the shared memory segment; writing the data to be written into the shared memory block corresponding to the index; acquiring the general flag lock variable when the data to be written is successfully written into the shared memory block corresponding to the index; and updating the value of the general flag variable with the index of the shared memory block.

In the present embodiment, the data transmitting process acquires the general flag lock variable before the data transmitting process writes data into the shared memory segment. Then, the data transmitting process determines the index of the shared memory block for storing the data to be written in the shared memory segment. The data transmitting process writes data into the determined shared memory block for storing the data to be written in the shared memory segment. The general flag lock variable is acquired when the data to be written is successfully written into the shared memory block corresponding to the index. The value of the general flag variable is updated with the index of the shared memory block for storing the data to be written.

In some optional implements of the present embodiment, the acquiring the most recent shared memory block index of the shared memory segment by the data receiver comprises: acquiring the general flag lock variable by the data receiving process; and reading the general flag variable so as to acquire the most recent shared memory block index of the share memory segment.

In the present embodiment, the general flag lock variable needs to be acquired before the data receiving process read data from the shared memory segment. After acquiring the general flag lock variable, the data receiving process may read the general flag variable to acquire the most recent shared memory block index of the shared memory segment.

At step 202, decision is made with regard to whether the most recent shared memory block index is consistent with the shared memory block index corresponding to the data recently read by the data receiver.

In the present embodiment, after acquiring the most recent shared memory block index of the shared memory segment for the data transmitter and the data receiver to transmit data at step 201, that is, after acquiring the index of the shared memory block in the shared memory segment where the recently written data is located, it can be decided whether the index of the shared memory block in the shared memory segment where the data recently written by the data transmitter is located is consistent with the shared memory block index corresponding to the data recently read by the data receiver.

The following description is made on basis of the example that the data transmitter is a data transmitting process and the data receiver is a data receiving process. Data may be transmitted between a plurality of data transmitting progresses and a plurality of data receiving processes via a same shared memory segment. The latest written data may be written into the shared memory segment by any one of the data transmitting processes. When any one of the plurality of data receiving processes reads data from the shared memory segment, it can be decided whether the index of the shared memory block in the shared memory segment where the latest written data is located is consistent with the shared memory block index corresponding to the data recently read by the data receiving process.

At step 203, determination is made, according to the decision, with regard to whether to read the data in the shared memory block corresponding to the most recent shared memory block index.

In the present embodiment, after deciding whether the most recent shared memory block index is consistent with the shared memory block index corresponding to the data recently read by the data receiver, it can be determined, according to the decision, whether to read the data in the shared memory block corresponding to the most recent shared memory block index.

In some optional implements of the present embodiment, the determining, according to the decision, whether to read the data in the shared memory block corresponding to the most recent shared memory block index comprises: ignoring the data in the shared memory block corresponding to the most recent shared memory block index if the decision indicates that the most recent shared memory block index is consistent with the shared memory block index corresponding to the data recently read by the data receiver; and reading the data in the shared memory block corresponding to the most recent shared memory block index if the decision indicates that the most recent shared memory block index is inconsistent with the shared memory block index corresponding to the data recently read by the data receiver.

The following description is made on basis of the example that the data transmitter is a data transmitting process and the data receiver is a data receiving process. Data may be transmitted between a plurality of data transmitting progresses and a plurality of data receiving processes via a same shared memory segment. When any one of the plurality of data receiving processes reads data from the shared memory segment, if the data receiving process decides that the index of the shared memory block in the shared memory segment where the recently written data is located is consistent with the shared memory block index corresponding to the data recently read by the data receiving process, it can be determined that the most recent data in the shared memory block has been acquired by the data receiving process. Therefore, the data receiving process ignores the data corresponding to the most recent shared memory block index. If the data receiving process decides that the index of the shared memory block in the shared memory segment where the recently written data is located is inconsistent with the shared memory block index corresponding to the data recently read by the data receiving process, it can be determined that the data in the shared memory block corresponding to the most recent shared memory block index is to be read.

The following description is made on basis of the example that the data transmitter and the data receiver are processes in an automatic-driving system. The data transmitting process may be used for capturing, via a camera, traffic images of the road on which an autonomous vehicle is currently traveling. The data receiving process is used for analyzing the traffic images to identify obstacles. The title between the data transmitting process and the data receiving process may be the type of the transmitted data, i.e., the traffic images. There may be a plurality of data transmitters and data receivers by utilizing the shared memory segment to transmit data. The plurality of data transmitters and data receivers may correspond to one title. The plurality of data transmitters may write the data to be transmitted into the shared memory segment corresponding to the title, and the plurality of data receivers may read the data to be transmitted from the shared memory segment corresponding to the title.

When the frequency at which the data receiving process processes data is lower than the frequency at which the data transmitting process transmits data, the data receiving process may directly read the most recent data (i.e., the most recent traffic images) and abandon the outdated data which is not processed in time (i.e., the outdated traffic images). Accordingly, the data receiving process may still identify the obstacles according to the most recent traffic images, without influencing other data receiving processes, which process data at a higher frequency, to identify the obstacles according to the traffic images. Accordingly, the extremely high demand for instantaneity for processing data by a process in the control system of the autonomous vehicle is satisfied. The data receiving process acquires sufficient amount of data to analyze and generates a driving decision timely and effectively. Therefore, the security and stability of the control system of the autonomous vehicle are improved.

Figure 3:
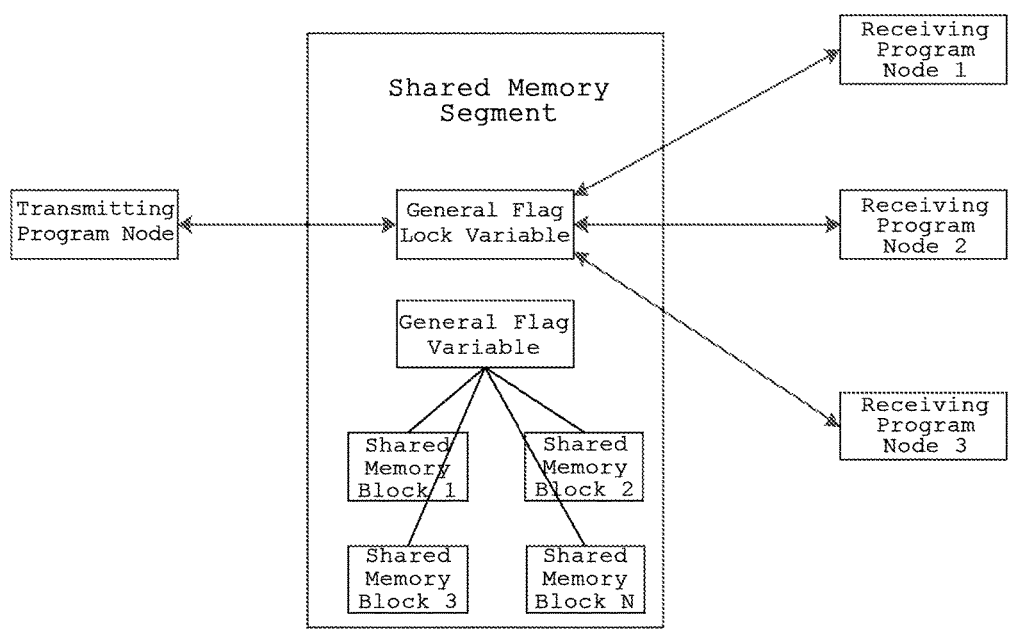
FIG. 3 illustrates an exemplary schematic diagram of a data transmission method according to the present application.

Reference is made to FIG. 3, which illustrates an exemplary schematic diagram of a data transmission method according to the present application.

In FIG. 3, a transmitting program node, a shared memory segment, and a plurality of receiving program nodes are illustrated. The plurality receiving program nodes are shown as a receiving program node 1, a receiving program node 2, and a receiving program node 3. The transmitting program node may be a data transmitting process, and the receiving program nodes may be data receiving processes.

The transmitting program node may publish a title which may be subscribed by each of the plurality of receiving program nodes. Data may be transmitted between the transmitting program node and the plurality of receiving program nodes via the shared memory segment corresponding to the title.

When the transmitting program node and the plurality of receiving program nodes writes or read the data to be transmitted by utilizing the shared memory segment corresponding to the title, the data to be transmitted may be written into or read from the shared memory segment by a unit of shared memory block. The data stored in the shared memory block may be referred to as a message.

In the shared memory segment corresponding to the title, a general identifier may be stored. The general identifier is utilized by the transmitting program node to write data in sequence and utilized by the receiving program nodes to read data in sequence. The general identifier may comprise a general flag variable and a general flag lock variable. Specifically, the flag variable is used for identifying the index of the most recent shared memory block into which data is currently written by the transmitting program node. All the receiving program nodes that subscribe the title may determine, by reading the flag variable, the next shared memory block to be read. The general flag lock variable is a mutually-exclusive variable. Since there may be a plurality of transmitting program nodes and receiving program nodes under a same title, the general flag lock variable is used for ensuring that only one transmitting program node or receiving program is authorized to modify or read the general flag variable at the same moment. The procedure in which the transmitting program node writes data into the shared memory segment is described below.

When the transmitting program node needs to write the message into the shared memory segment, at the first step, the transmitting program node may acquire the general flag lock variable to read the value of the present general flag variable. The next shared memory block in the shared memory segment into which data may be written, i.e., the shared memory block into/from which no data has been written or read at present, may be calculated by a traversal calculation. The transmitting program node may acquire an exclusive lock of the shared memory block. At the same time, a record is made that a transmitting program node is ready to write data at present. Thereafter, a message is written into the shared memory block. If the transmitting program node succeed to write the message, the transmitting program node is allowed to modify the general flag variable after it acquires the general flag lock variable again. If the transmitting program node fails to write data, the message may be abandoned and the transmitting program node may return to transmit the next message.

The procedure in which the plurality of receiving program nodes read data from the shared memory segment is described below.

The receiving program nodes may read the value of the present general flag variable after acquiring the general flag lock variable. Then the receiving program nodes may search, according to the value of the general flag variable, the next shared memory block from which the data may be read. Thereafter, it can be detected whether the index of the shared memory block is consistent with the most recent shared memory block index. If the index of the shared memory block is consistent with the most recent shared memory block index, it indicates that the frequency for reading data by the receiving program nodes is higher than the frequency for writing data by the transmitting program node. Therefore, the receiving program nodes do not read the message corresponding to the shared memory block. In contrast, the receiving program nodes may transmit a status signal and wait for a new message to be written next. If the index of the shared memory block is inconsistent with the most recent shared memory block index, it indicates that the frequency for reading data by the receiving program nodes is not higher than the frequency for writing data by the transmitting program node. Therefore, the receiving program node may ignore the messages which are read in the duration between the last read time and the present read time, and may directly read the most recent message corresponding to the shared memory block. The receiving program nodes may return to be ready for reading the next message regardless whether it succeed to read the message at the present time.

In the present embodiment, the transmitting program node may continuously write data into the shared memory segment. When the frequency for processing data by the receiving program nodes is lower than the frequency for transmitting data by the transmitting program node, the receiving program nodes read the most recent data directly and abandon the outdated data which is not processed in time. On one hand, this prevents the transmitting program node from being blocked caused by taking processes with low data processing frequencies into account, and thus improves the operating efficiency of the data transmission system. On the other hand, this enables the most recent data to be timely written into the shared memory segment, and thus the most recent data may be processed by the receiving program nodes. Therefore, the extremely high demand for instantaneity for processing data by the process in the control system of an autonomous vehicle, for example, is satisfied.

Figure 4:
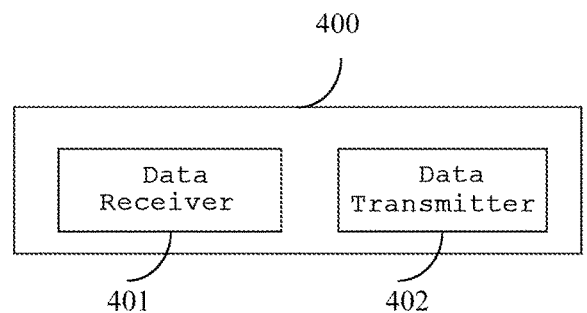
FIG. 4 illustrates a structural diagram of a data transmission system according to an embodiment of the present application.

Reference is now made to FIG. 4. The present application provides an embodiment of a data transmission system as an implementation of the methods shown in the above figures. The embodiment shown in FIG. 4 corresponds to the embodiment of the method shown in FIG. 2.

As shown in FIG. 4, the data transmission system of the present embodiment comprises a data receiver 401 and a data transmitter 402. Specifically, the data receiver 401 is used for: acquiring a most recent shared memory block index of a shared memory segment, the shared memory segment being used by the data transmitter 401 and the data receiver 402 to transmit data, the most recent shared memory block index being used for indicating an address of a shared memory block in a shared memory segment where data recently written by the data transmitter is located; deciding whether the most recent shared memory block index is consistent with a shared memory block index corresponding to data recently read by the data receiver; and determining, according to the decision, whether to read the data in the shared memory block corresponding to the most recent shared memory block index.

In some optional implements of the present embodiment, the data transmitter is a data transmitting process, and the data receiver is a data receiving process.

In some optional implements of the present embodiment, the shared memory segment comprises a general flag variable and a general flag lock variable, the general flag variable being used for storing the most recent shared memory block index.

In some optional implements of the present embodiment, the data receiving process is used for: acquiring the general flag lock variable; and reading the general flag variable so as to acquire the most recent shared memory block index of the share memory segment.

In some optional implements of the present embodiment, the data transmitting process is used for: acquiring the general flag lock variable; determining an index of a shared memory block for storing data to be written in the shared memory segment; writing the data to be written into the shared memory block corresponding to the index; acquiring the general flag lock variable when the data to be written is successfully written into the shared memory block corresponding to the index; and updating a value of the general flag variable with the index of the shared memory block.

In some optional implements of the present embodiment, the data receiving process is used for: ignoring the data in the shared memory block corresponding to the most recent shared memory block index if the decision indicates that the most recent shared memory block index is consistent with the shared memory block index corresponding to the data recently read by the data receiver; and reading the data in the shared memory block corresponding to the most recent shared memory block index if the decision indicates that the most recent shared memory block index is inconsistent with the shared memory block index corresponding to the data recently read by the data receiver.

Figure 5:
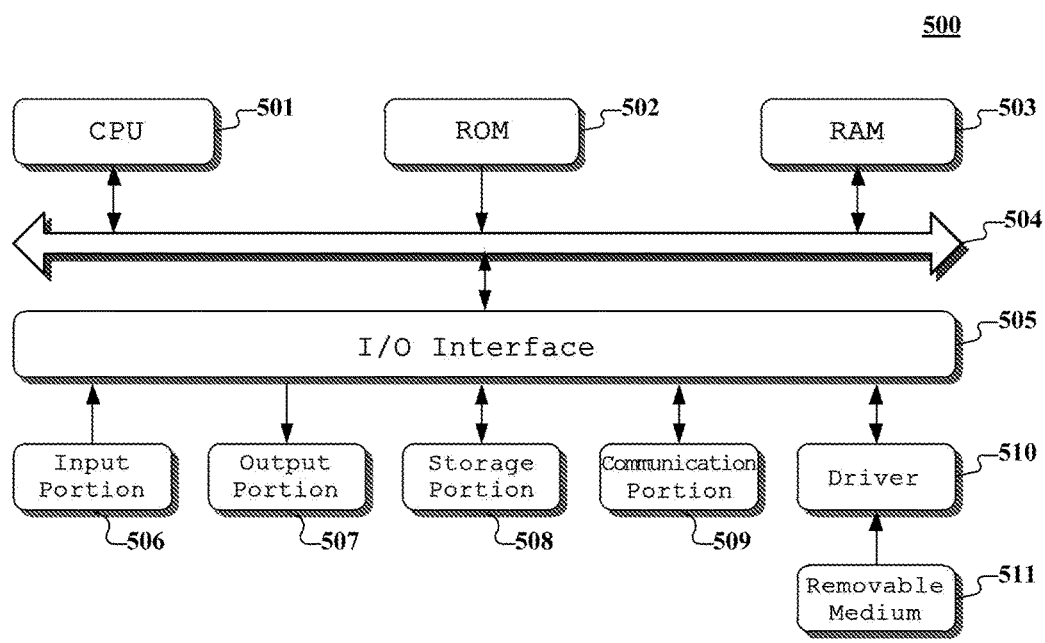
FIG. 5 illustrates a structural schematic diagram of a computer system adapted to implement the data transmission system of the embodiments of the present application.

FIG. 5 illustrates a schematic structural diagram of a computer system adapted to implement the data transmission system according to the embodiment of the present application.

As shown in FIG. 5, the computer system 500 includes a central processing unit (CPU) 501, which may execute various appropriate actions and processes in accordance with a program stored in a read-only memory (ROM) 502 or a program loaded into a random access memory (RAM) 503 from a storage portion 508. The RAM 503 also stores various programs and data required by operations of the system 500. The CPU 501, the ROM 502 and the RAM 503 are connected to each other through a bus 504. An input/output (I/O) interface 505 is also connected to the bus 504.

The following components are connected to the I/O interface 505: an input portion 506 including a keyboard, a mouse etc.; an output portion 507 comprising a cathode ray tube (CRT), a liquid crystal display device (LCD), a speaker etc.; a storage portion 508 including a hard disk and the like; and a communication portion 509 comprising a network interface card, such as a LAN card and a modem. The communication portion 509 performs communication processes via a network, such as the Internet. A driver 510 is also connected to the I/O interface 505 as required. A removable medium 511, such as a magnetic disk, an optical disk, a magneto-optical disk, and a semiconductor memory, may be installed on the driver 510, to facilitate the retrieval of a computer program from the removable medium 511, and the installation thereof on the storage portion 508 as needed.

In particular, according to an embodiment of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method of the flow chart. In such an embodiment, the computer program may be downloaded and installed from a network via the communication portion 509, and/or may be installed from the removable media 511.

The flowcharts and block diagrams in the figures illustrate architectures, functions and operations that may be implemented according to the system, the method and the computer program product of the various embodiments of the present invention. In this regard, each block in the flow charts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

In another aspect, the present application further provides a nonvolatile computer storage medium. The nonvolatile computer storage medium may be the nonvolatile computer storage medium included in the apparatus in the above embodiments, or a stand-alone nonvolatile computer storage medium which has not been assembled into the apparatus. The nonvolatile computer storage medium stores one or more programs. When the one or more programs are executed by an apparatus, the apparatus is caused to perform: acquiring a most recent shared memory block index of a shared memory segment by a data receiver, the shared memory segment being used by a data transmitter and the data receiver to transmit data, the most recent shared memory block index being used for indicating an address of a shared memory block in a shared memory segment where data recently written by the data transmitter is located; deciding whether the most recent shared memory block index is consistent with a shared memory block index corresponding to data recently read by the data receiver; and determining, according to the decision, whether to read the data in the shared memory block corresponding to the most recent shared memory block index.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

What is claimed is:

1. A data transmission method, the method comprising:
   acquiring a most recent shared memory block index of a shared memory segment by a data receiver, the shared memory segment being used by a data transmitter and the data receiver to transmit data, the most recent shared memory block index being used for indicating an address of a shared memory block in a shared memory segment where data recently written by the data transmitter is located;

deciding whether the most recent shared memory block index is consistent with a shared memory block index corresponding to data recently read by the data receiver; and determining, according to the decision, whether to read the data in the shared memory block corresponding to the most recent shared memory block index, wherein the determining, according to the decision, whether to read the data in the shared memory block corresponding to the most recent shared memory block index comprises:

ignoring the data in the shared memory block corresponding to the most recent shared memory block index if the decision indicates that the most recent shared memory block index is consistent with the shared memory block index corresponding to the data recently read by the data receiver; and reading the data in the shared memory block corresponding to the most recent shared memory block index when the decision indicates that the most recent shared memory block index is inconsistent with the shared memory block index corresponding to the data recently read by the data receiver, wherein the shared memory segment comprises a general flag variable and a general flag lock variable, the general flag variable being used for storing the most recent shared memory block index; and the acquiring the most recent shared memory block index of the shared memory segment by the data receiver comprising:

acquiring the general flag lock variable by the data receiver; and reading the general flag variable so as to acquire the most recent shared memory block index of the share memory segment.

2. The method according to claim 1, wherein the data transmitter is a data transmitting process, and the data receiver is a data receiving process.

3. The method according to claim 2, the method further comprising:

acquiring the general flag lock variable by the data transmitting process;

determining an index of a shared memory block for storing data to be written in the shared memory segment;

writing the data to be written into the shared memory block corresponding to the index;

acquiring the general flag lock variable when the data to be written is successfully written into the shared memory block corresponding to the index; and updating a value of the general flag variable with the index of the shared memory block.

4. A data transmission system, comprising:

at least one processor; and a memory storing instructions, which when executed by the at least one processor, cause the at least one processor to perform operations, the operations comprising:

acquiring a most recent shared memory block index of a shared memory segment by a data receiver, the shared memory segment being used by a data transmitter and the data receiver to transmit data, the most recent shared memory block index being used for indicating an address of a shared memory block in a shared memory segment where data recently written by the data transmitter is located;

deciding whether the most recent shared memory block index is consistent with a shared memory block index corresponding to data recently read by the data receiver; and determining, according to the decision, whether to read the data in the shared memory block corresponding to the most recent shared memory block index, wherein the determining, according to the decision, whether to read the data in the shared memory block corresponding to the most recent shared memory block index comprises:

ignoring the data in the shared memory block corresponding to the most recent shared memory block index if the decision indicates that the most recent shared memory block index is consistent with the shared memory block index corresponding to the data recently read by the data receiver; and reading the data in the shared memory block corresponding to the most recent shared memory block index when the decision indicates that the most recent shared memory block index is inconsistent with the shared memory block index corresponding to the data recently read by the data receiver, wherein the shared memory segment comprises a general flag variable and a general flag lock variable, the general flag variable being used for storing the most recent shared memory block index; and the acquiring the most recent shared memory block index of the shared memory segment by the data receiver comprising:

acquiring the general flag lock variable by the data receiver; and reading the general flag variable so as to acquire the most recent shared memory block index of the share memory segment.

5. The data transmission system according to claim 4, wherein the data transmitter is a data transmitting process, and the data receiver is a data receiving process.

6. The data transmission system according to claim 4, wherein the operations further comprise:

acquiring the general flag lock variable;

determining an index of a shared memory block for storing data to be written in the shared memory segment;

writing the data to be written into the shared memory block corresponding to the index;

acquiring the general flag lock variable when the data to be written is successfully written into the shared memory block corresponding to the index; and updating a value of the general flag variable with the index of the shared memory block.

7. A non-transitory storage medium storing one or more programs, the one or more programs when executed by an apparatus, causing the apparatus to perform a data transmission method, comprising:

acquiring a most recent shared memory block index of a shared memory segment by a data receiver, the shared memory segment being used by a data transmitter and the data receiver to transmit data, the most recent shared memory block index being used for indicating an address of a shared memory block in a shared memory segment where data recently written by the data transmitter is located;

deciding whether the most recent shared memory block index is consistent with a shared memory block index corresponding to data recently read by the data receiver; and determining, according to the decision, whether to read the data in the shared memory block corresponding to the most recent shared memory block index, wherein the determining, according to the decision, whether to read the data in the shared memory block corresponding to the most recent shared memory block index comprises:

ignoring the data in the shared memory block corresponding to the most recent shared memory block index if the decision indicates that the most recent shared memory block index is consistent with the shared memory block index corresponding to the data recently read by the data receiver; and reading the data in the shared memory block corresponding to the most recent shared memory block index when the decision indicates that the most recent shared memory block index is inconsistent with the shared memory block index corresponding to the data recently read by the data receiver, wherein the shared memory segment comprises a general flag variable and a general flag lock variable, the general flag variable being used for storing the most recent shared memory block index; and the acquiring the most recent shared memory block index of the shared memory segment by the data receiver comprising:

acquiring the general flag lock variable by the data receiver; and reading the general flag variable so as to acquire the most recent shared memory block index of the share memory segment.

* * * * *